F. S. CARR.

STUD AND SOCKET FASTENER.

APPLICATION FILED MAY 22, 1918.

Reissued July 9, 1918.

14,492.

Inventor:
Fred S. Carr,
by Emery, Booth, Janney & Varney
Attys.

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

STUD-AND-SOCKET FASTENER.

14,492. Specification of Reissued Letters Patent. Reissued July 9, 1918.

Original No. 1,184,319, dated May 23, 1916, Serial No. 46,069, filed August 18, 1915. Application for reissue filed May 22, 1918. Serial No. 236,059.

*To all whom it may concern:*

Be it known that I, FRED S. CARR, a citizen of the United States, and resident of Newton, in the county of Middlesex and State of Massachusetts, have invented certain new and useful Improvements in Stud-and-Socket Fasteners, of which the following is a specification.

This invention relates to a stud and socket fastener comprising, first, a cylindrical stud member having an attaching base and an annular shoulder surrounding the axis of the stud member and facing inwardly toward the base, and, secondly, a socket member composed of a casing inclosing a jaw-receiving space and having openings for the entrance of the stud member into said space, and resilient jaws confined in said space and formed to engage said annular shoulder and coöperate therewith in resisting separation of the members by a direct outward pull on the socket member.

A fastener of the type to which my invention relates is disclosed by Letters Patent of the United States, Number 1,038,288, said patented fastener having jaws formed to engage the annular stud shoulder in such manner that separation of the members by a direct outward pull on the socket member is prevented or strongly resisted, and is freely permitted by a tipping movement of the socket member in one direction only, the shoulder and jaws resisting tipping movements of the socket member in other directions.

The present invention relates particularly to the construction of the socket member of the casing and is embodied in limiting means on the said casing adapted to coöperate with the inner portion of the stud member in opposing free tipping movements of the socket member in certain directions, said limiting means being auxiliary to the limiting means provided by the shoulder and jaws, and adapted to relieve the jaws of a part of the duty heretofore imposed on them in opposing said tipping movements.

The invention is also embodied in means for preventing excessive wear of parts of the fastener which rub and rattle in contact with each other when in use, and in means for facilitating the opening and closing movement of the resilient jaws.

Of the accompanying drawing forming a part of this specification:

Figure 4:
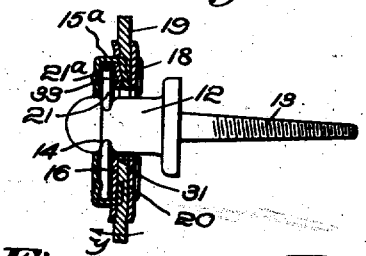
Fig. 4 represents a sectional view of the socket member with all its parts assembled and a side view of a stud member engaged therewith.
Figure 5A:
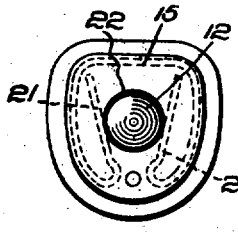
Fig. 5 represents a view similar to Fig. 4, showing the direction of the free tipping movement of the socket member.
Figure 5:
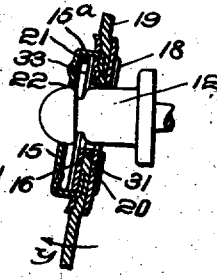
Figure 6A:
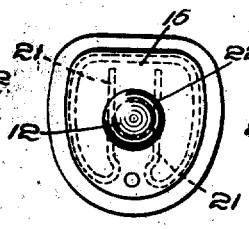
Fig. 6 represents a view similar to Fig. 5, showing the resistance to a tipping movement of the socket member in a different direction.
Figure 6:
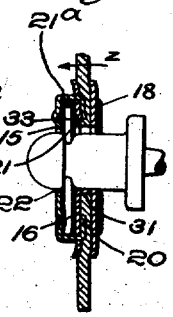
Figure 7:
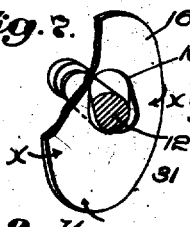
Figure 8:
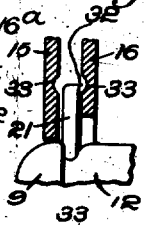
Figure 8A:
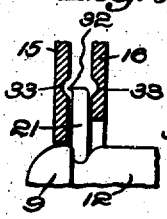
Figure 8B:
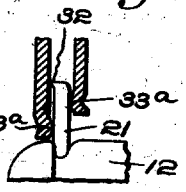
Figure 9:
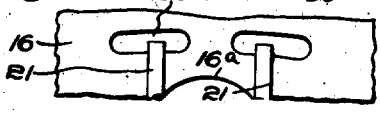

Fig. 5ª represents a front view of the fastener with the socket and stud members in the relative positions shown by Fig. 5;

Fig. 6ª represents a front view of the fastener with the socket and stud members in the relative positions shown by Fig. 6;

Fig. 7 represents a perspective view of a portion of the socket member, and a portion of the stud member;

Figs. 8 and 8ª represent enlargements of portions of Fig. 4;

Fig. 8ᵇ represents a view similar to Figs. 8 and 8ª, showing a modification;

Fig. 9 represents a section on line 9—9 of Fig. 8, the stud 12 being omitted.

The same reference characters indicate the same or similar parts in all the views.

In the drawings, 12 represents the cylindrical stud member having at its inner portion or base a suitable means whereby it may be attached to a stud-carrying part, and at its outer portion an annular inwardly facing shoulder 14. As here shown, the stud member has a screw-threaded shank 13 adapted to engage a rigid frame member. The stud member may however be provided with means for attachment to a flexible carrying member of sheet material. The socket member is composed of a jaw holding casing composed of assembled plates 15, 16 and 20, the outer plate 15 having a marginal flange 15ª on which are formed short ears 17 inserted in slots in the intermediate plate 16 and bent over the back of said plate 16 and holding it against the flange 15ᵃ, the plates 15 and 16 being spaced apart and forming the sides of the jaw receiving space. The said flange is provided with longer ears or prongs 18 adapted to penetrate a curtain 19, or other carrying part of flexible sheet material, and enter slots in the plate 20, between which and the plate 16 the curtain is interposed. An opening 22 is formed in the plate 15 to receive the head of the stud member 12, said opening closely fitting the stud head and serving to center the same relatively to the casing and its jaws.

Figure 1:
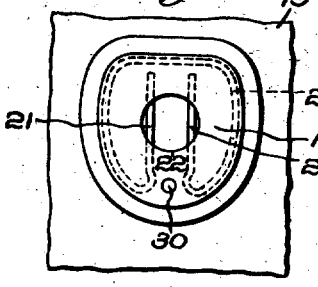
Figure 1 represents a front view of the socket member of a stud and socket fastener embodying my invention.

21, 21 represent resilient wire jaws which are the end portions of a piece or length of wire preferably bent as shown by Fig. 1 to form said jaws and a loop 21ᵃ connecting the same, the said jaws and loop being interposed between the plates 15 and 16. The jaws are adapted to spring into engagement with the stud shoulder 14. The jaws as here shown are straight and substantially parallel with each other, although they may be provided with segmental portions bearing on an extended portion of said shoulder at one side of the stud, as shown by the drawing of the above mentioned patent.

The jaws coöperate with the stud shoulder in preventing or strongly resisting separation of the members by a direct outward pull on the socket member, and are freely separable from the stud shoulder only by a tipping movement of the socket member relatively to the stud member, this movement causing a portion of the shoulder to act as a wedge and separate the jaws. To cause this wedging action of the shoulder, the socket member and jaws must be considerably inclined relatively to the axis of the stud member, as shown by Fig. 5, this inclination causing the stud shoulder to enter the space between the jaws and outwardly displace or separate the jaws, as shown by Fig. 5ᵃ.

I have found that by forming the casing of the socket member so that its back portion will coöperate with the stud member in permitting the longitudinal tipping of the socket member to the position shown by Fig. 5, and in preventing an opposite inclination of the socket member, such as would be produced by tipping it in the direction of the arrow *z* (Fig. 6), the inner portion or body of the stud member is enabled to perform a considerable part of the duty of preventing all tipping movements excepting the predetermined one, the jaws and the plates between which they are confined being relieved of a corresponding part of this duty, so that strain on said jaws and plates is reduced to the minimum and the jaws when made straight, as here shown, instead of having segmental portions as before, perform their function effectively. The diameter of the opening 22 in the front plate 15 is but little larger than that of the stud head, the latter fitting closely in said opening.

To enable the socket member casing to coöperate as above stated, with the stud member, I provide the socket casing plates 16 and 20 with stud-receiving openings 16ᵃ and 20ᵃ. The lower margins of these openings are substantially in alinement with the lower margin of the opening 22 in the front plate. The openings 16ᵃ and 20ᵃ are elongated however, each being elliptical so that their upper margins are higher than the upper margin of the opening 22. The lower margins of the openings 16ᵃ and 20ᵃ bear on the lower side of the stud body when the members are operatively connected, and prevent a sufficient tipping of the socket member in the direction of arrow *z* (Fig. 6) to cause the stud shoulder to wedge the jaws apart. The upper margins of said openings are separated from the upper side of the stud body when the members are operatively connected, and permit the tipping of the socket member to the position shown by Fig. 5, and the outward displacement of the jaws by the stud shoulder shown by Fig. 5ᵃ. The width of the elliptical openings 16ᵃ, 20ᵃ is preferably such that the margins of these openings contact with the stud member at diametrically opposite sides of the latter, as indicated by Fig. 7, and coöperate with said member in preventing crosswise tipping movements of the socket member in the directions indicated by the arrows *x*, *x*. It will now be seen that the casing and the inner portion of the stud member coöperate in opposing any tipping movement of the socket member which is not desired, and relieve the stud shoulder and the jaws from a part of the duty of opposing said tipping movements, the elongation of the openings 16ᵃ and 20ᵃ permitting the predetermined tipping movement which causes the displacement of the jaws. The circular form of the stud member enables it to be arbitrarily applied to its support, or in other words, without causing a given side of the stud to face in a given direction, as explained in the above mentioned patent.

Figure 3:
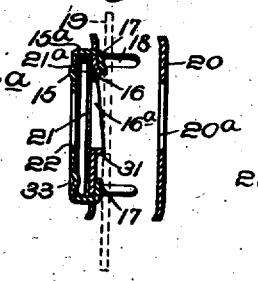
Fig. 3 represents a section on line 3—3 of Fig. 2, the back plate being separated from the body of the socket member and the carrying parts shown by dotted lines.
Figure 2:
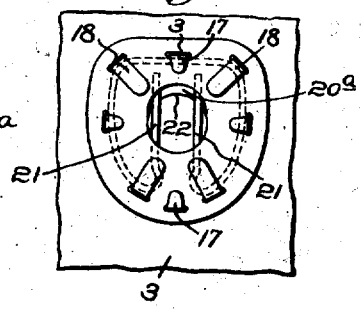
Fig. 2 represents a back view of the same.

The socket member may be so attached to its support that the edge portion of the casing which is free to tip outwardly in the direction of arrow *y* may be located above, below, or at either side of the stud-receiving opening. To identify the said portion of the casing so that the operator may readily determine where to apply the tipping or lifting pressure, I provide the casing with identifying means, preferably by forming a circular inwardly projecting boss or depression 30 in its outer face, as shown by Figs. 1 and 3. The location of said depression relatively to the jaws confined in the casing is such that the edge portion of the casing nearest the depression is the portion to which tipping or lifting force must be applied in the direction of arrow *y* to effect the separation of the members. To prevent or reduce wear of the surface of the stud member by the contact of the lower margin of the opening 16ᵃ with said surface, I provide the plate 16 with a lip or flange 31 which provides a stud seat or bearing of sufficient area to minimize such wear.

The piece of wire which includes the jaws 21 is cut from a supply of wire of indeterminate length, by cutters constituting parts of a machine for forming the jaws 21 and loop 21ᵃ. Said cutters usually leave burs 32 (Figs. 8 and 8ᵃ) on the ends of the wire piece, and said burs are liable to project toward the plate 15 or the plate 16, or toward both plates, and bear on the inner surface of said plate or plates, and resist the opening and closing movements of the jaws so that an undesirable degree of force is often required in connecting and separating the members of the fastener. To obviate this objection I provide the inner surfaces of the plates 15 and 16 with shallow depressions 33 arranged to receive said burs and prevent them from contacting with the plates. Fig. 8ᵇ shows as a modification an equivalent means for preventing contact between the burred outer ends of the jaws and the jaw confining surfaces of the casing, said means being embodied in inwardly projecting beads or ribs 33ᵃ presenting smooth surfaced guides for portions of the jaws below the burs.

In a carriage or automobile curtain fastener the chief tipping strain to be resisted by the fastener is that in the direction of arrow *z* (Fig. 6), and no provision is absolutely necessary to resist strains tending to tip the socket and jaws laterally in the directions indicated by arrows *x*, *x* (Fig. 7). I do not limit myself therefore to the illustrated form of the openings 16ᵃ and 20ᵃ, whereby they are enabled to oppose such lateral tipping strains, and may form said openings so that they will oppose only a strain tending to tip the socket and jaws in the direction of arrow *z*.

Having described my invention, I claim:—

1. A stud and socket fastener comprising a stud member having an annular inwardly facing shoulder at its outer end portion, and a socket member composed of a casing including an outer plate having a centering opening fitting the stud, an intermediate plate, and a back plate, and resilient jaws confined between said outer and intermediate plates and coöperating with said shoulder in opposing a direct outward movement of the casing relatively to the stud, said jaw being displaceable to release said shoulder by a tipping movement of the casing and jaws relatively to the stud, said back plate being spaced from the jaws and provided with an elongated opening formed to coöperate with the inner portion of the stud in opposing a tipping movement of the socket and jaws in one or more directions, and in permitting such tipping movement in a different direction.

2. A stud and socket fastener comprising a stud member having an annular inwardly facing shoulder at its outer end portion, and a socket member composed of a casing including an outer plate having a centering opening fitting the stud, an intermediate plate, and a back plate, and resilient jaws confined between said outer and intermediate plates and coöperating with said shoulder in opposing a direct outward movement of the casing relatively to the stud, said jaws being displaceable to release said shoulder by a tipping movement of the casing and jaws relatively to the stud, said back plate being spaced from the jaws and provided with an elongated opening formed to coöperate with the inner portion of the stud in opposing a transverse tipping movement of the socket and jaws in either direction and a longitudinal tipping movement in one direction, and in permitting a longitudinal tipping movement of the socket and jaws in a different direction.

3. A stud and socket fastener comprising a stud member having an annular inwardly facing shoulder at its outer end portion, and a socket member composed of a casing including an outer plate, an intermediate plate, and a back plate, and resilient jaws confined between said outer and intermediate plates and coöperating with said shoulder in opposing a direct outward movement of the casing relatively to the stud, said jaws being displaceable to release said shoulder by a tipping movement of the casing and jaws relatively to the stud, said front plate being provided with a centering opening fitting the stud, and the intermediate and back plates being provided with elongated openings formed to coöperate with the inner portion of the stud in opposing a tipping movement of the socket and jaws in one or more directions, and in permitting such tipping movement in a different direction.

4. A stud and socket fastener comprising a stud member having an inwardly facing jaw-engaging shoulder, and a socket member including an outer plate, an intermediate plate and a back plate having openings to receive the stud member, and resilient jaws confined between the front and intermediate plates, one of the two last mentioned plates being provided with a flange constituting a relatively wide wear-reducing seat for the stud between said plates.

5. A stud and socket fastener comprising a stud member having an inwardly facing jaw-engaging shoulder, and a socket member including an outer plate, an intermediate plate and a back plate having openings to receive the stud member, and resilient jaws confined between the front and intermediate plates, the front plate and the intermediate plate being provided with means for preventing contact between the burred outer ends of said jaws and the surfaces of said plates.

6. A stud and socket fastener comprising a stud having a head providing a locking shoulder and a socket comprising a casing, means in the casing for engaging said shoulder, said casing having an opening for the introduction of said stud formed closely to fit said stud on one side thereof rearwardly of said shoulder and being extended on the opposite side to provide a clearance.

7. A stud and socket fastener comprising a stud having an annular reduced neck and a socket comprising a casing, resilient means within said casing for engaging said neck, said casing having an opening in the wall thereof providing for the insertion of said stud having a width substantially equal to the diameter of the stud and a length greater whereby relative tipping of the parts from three sides will be resisted by engagement of said wall with the stud at a point spaced from said neck and permitted from the fourth side.

8. A stud and socket fastener comprising a stud having a reduced annular neck providing a symmetrical head and a socket having a wall provided with an elongated opening to receive the stud, the socket providing means coöperating with said head to hold the elements against axial separation and with the stud positioned against one end of the opening.

9. A fastener comprising a stud and a socket having means for interlocking therewith, said socket providing two-point support for said stud at the bottom and two sides thereof and a single point support at the top thereof.

10. A stud and socket fastener comprising a stud having a reduced neck, a socket comprising spaced walls having apertures to receive the stud, jaw means between said walls for engaging said neck, one aperture substantially fitting said stud, the other being alined therewith throughout a part of the perimeter thereof but extended on one side to provide a clearance between the same and the stud.

11. A fastener as defined in claim 10 wherein the stud is symmetrical and annularly grooved to provide said neck.

12. A fastener comprising a stud having a shoulder, a socket having resilient means for engaging the shoulder and tending to separate therefrom on relative tilting of the stud and socket, said socket having an elongated opening at one end of which the stud seats at a point remote from the neck.

13. A fastener comprising a stud and a socket having jaws for engagement therewith and having an elongated opening to receive said stud provided with a flange at one end extending lengthwise of the stud for engagement therewith.

14. A socket for fasteners comprising a casing having walls, a resilient jaw member confined between the same, the casing having means for preventing contact between the burred ends of said member and the walls.

15. In combination with a symmetrical stud of circular section, a socket having yielding means for interlocking with the stud and provided with an opening to admit the stud partially circular but eccentrically extended at one side.

In testimony whereof I have affixed my signature.

FRED S. CARR.